United States Patent
Sava et al.

(10) Patent No.: US 10,129,882 B1
(45) Date of Patent: Nov. 13, 2018

(54) SYSTEMS AND METHODS FOR ALLOCATING RESOURCE BLOCKS BASED ON UPLINK TRANSMISSION PARAMETERS

(71) Applicant: Sprint Spectrum LP, Overland Park, KS (US)

(72) Inventors: Herkole Sava, Centreville, VA (US); Ankit Muchhala, Leesburg, VA (US); Michael Witherell, Portland, OR (US)

(73) Assignee: Sprint Spectrum L.P., Overland Park, KS (US)

( * ) Notice: Subject to any disclaimer, the term of this patent is extended or adjusted under 35 U.S.C. 154(b) by 80 days.

(21) Appl. No.: 15/183,033

(22) Filed: Jun. 15, 2016

(51) Int. Cl.
- *H04W 4/00* (2018.01)
- *H04W 72/04* (2009.01)
- *H04W 52/36* (2009.01)
- *H04W 52/34* (2009.01)
- *H04B 1/10* (2006.01)

(52) U.S. Cl.
CPC .......... *H04W 72/0453* (2013.01); *H04B 1/10* (2013.01); *H04W 52/34* (2013.01); *H04W 52/365* (2013.01); *H04W 72/0473* (2013.01)

(58) Field of Classification Search
CPC ................. H04W 72/04; H04B 1/10
USPC .......................... 370/328–339; 375/316–346
See application file for complete search history.

(56) References Cited

U.S. PATENT DOCUMENTS

| | | | |
|---|---|---|---|
| 2014/0023010 A1 | 1/2014 | Loehr et al. | |
| 2014/0119333 A1 | 5/2014 | Hedlund et al. | |
| 2017/0230843 A1* | 8/2017 | Ouchi | H04W 16/32 |
| 2017/0265176 A1* | 9/2017 | Marinier | H04W 72/044 |

* cited by examiner

*Primary Examiner* — Iqbal Zaidi

(57) ABSTRACT

Systems and methods are described for allocating resource blocks based on uplink transmission parameters, resulting in beneficial coverage and capacity of a wireless system. A headroom report that comprises a transmission power headroom for a wireless device may be received. Potential resource block allocations for the wireless device may be generated based on channel information for a plurality of frequency bands, the generated potential resource block allocations comprising a frequency band and a time slot. A potential resource block allocation may be selected from among the potential resource block allocations based on a maximum power reduction for the allocation and the reported transmission power headroom for the wireless device. The selected resource blocks may then be allocated for the wireless device.

17 Claims, 9 Drawing Sheets

SYSTEMS AND METHODS FOR ALLOCATING RESOURCE BLOCKS BASED ON UPLINK TRANSMISSION PARAMETERS

TECHNICAL BACKGROUND

Telecommunication systems, such as cellular networks or other wireless networks, provide access points such that wireless devices may access the systems. For example, an access node may comprise an access point used by a wireless device to gain access to a communication network. However, the access node may communicate with a number of wireless devices that comprise a number of different wireless channel conditions. For instance, a first wireless device may be located near the access node while a second wireless device may be located near a cell edge for the access node. In such a circumstance, the wireless device near the cell edge may experience coverage issues, for instance based on channel conditions on an uplink channel from the wireless device to the access node. Accordingly, it may be beneficial for a system to balance services provided to wireless devices by scheduling wireless resources based on uplink transmission parameters.

OVERVIEW

Systems and methods are described for allocating resource blocks based on uplink transmission parameters. A headroom report that comprises a transmission power headroom for a wireless device may be received. Potential resource block allocations for the wireless device may be generated based on channel information for a plurality of frequency bands and the generated potential resource block allocations comprising a frequency band and a time slot. A potential resource block allocation may be selected from among the potential resource block allocations based on a maximum power reduction for the allocation and the reported transmission power headroom for the wireless device. The selected resource blocks may then be allocated for the wireless device.

DETAILED DESCRIPTION

Systems and methods are described for allocating resource blocks based on uplink transmission parameters. Uplink transmit power for wireless devices communicating with an access node may affect the coverage area for the access node. For example, uplink transmit power reductions, such as those required to comply with standards for wireless communications or local regulations for wireless transmissions, may have a negative effect on the coverage area of an access node. In some embodiments, parameters that may lead to transmit power reductions for a wireless device may be considered when allocating resource blocks. For example, for a selected wireless device, a number of potential resource block allocations may be generated. One of the generated allocations may then be selected based on a power headroom for the wireless device and potential reduction values to the uplink transmission power for the allocation. Allocations based on these parameters may both allocate resource blocks effectively for uplink transmissions and allocate resource blocks to wireless device near a cell edge that are less likely to be impacted by uplink transmit power reductions. For instance, such a scheduling technique is less likely to allocate wireless resources that have beneficial power reduction values to wireless devices that have little to gain from such beneficial values (e.g., wireless devices not near the cell edge). Accordingly, these wireless resources that have beneficial power reduction values may be available to wireless devices that can gain from the beneficial values (e.g., wireless devices near the cell edge).

Figure 1:
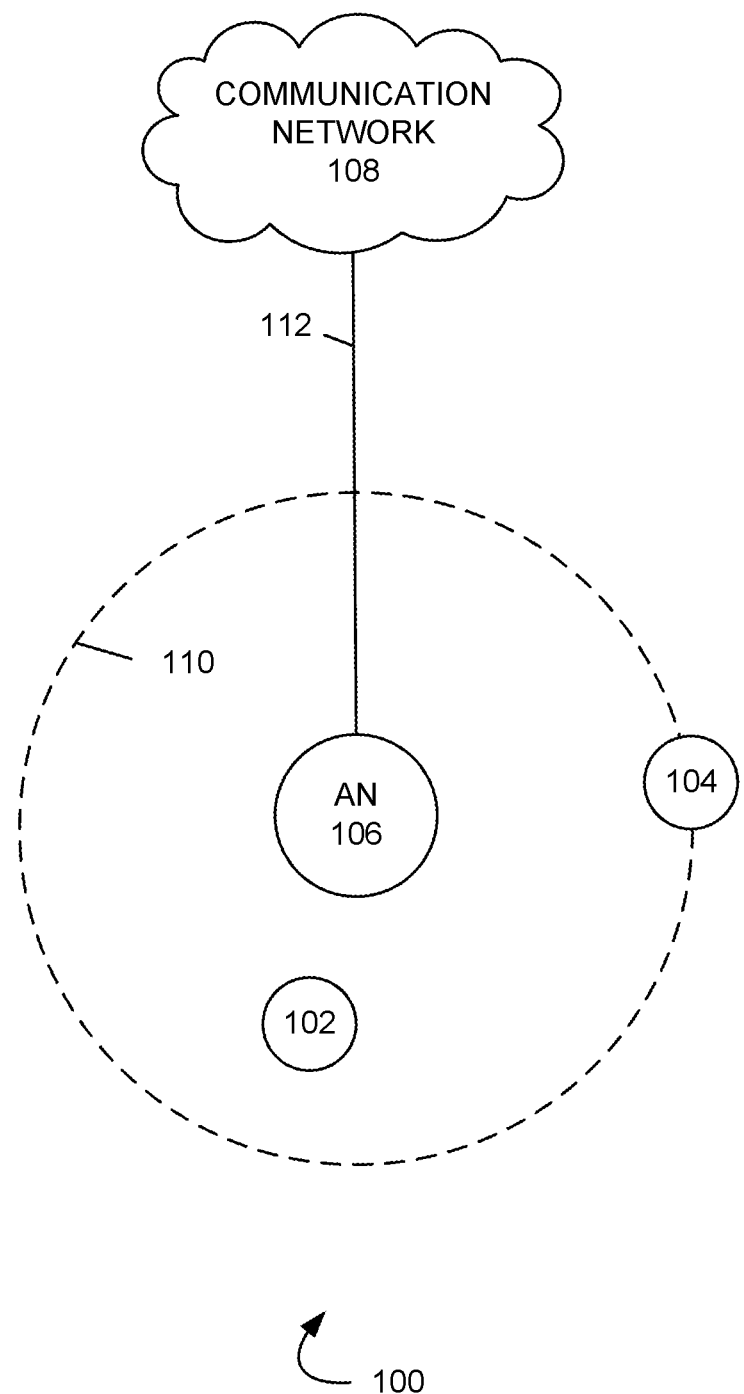
FIG. 1 illustrates an exemplary communication system to allocating resource blocks based on uplink transmission parameters.

FIG. 1 illustrates an exemplary communication system 100 to allocate resource blocks based on uplink transmission parameters comprising wireless devices 102 and 104, access node 106, communication network 108, coverage areas 110, and communication link 112. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 106 and communication network 108 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, relay communication device, or an internet access device, and combinations thereof. It is noted that while three wireless devices are illustrated in FIG. 1 as being in communication with the depicted access node and antenna system, any number of wireless devices can be implemented.

Access node 106 is a network node capable of providing wireless communication to wireless device 102, and can be, for example, a base transceiver station, a radio base station, an eNodeB device, a small cell (i.e. pico node, femto node, and the like), or any other suitable network element. Access node 106 may communicate with communication network 108 over communication link 112. Although only one access node is illustrated in FIG. 1, wireless device 102 (and other wireless device not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication link 112 can be a wired or wireless communication link. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

In operation, access node 106 may establish communication with wireless devices 102 and 104 such that access node 106 provides the wireless devices access to a communication network (e.g., communication network 108). In an embodiment, system 100 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 106 may comprise coverage area 110. For example, a coverage area may be the area around an access node or cell where a wireless device may detect wireless signals transmitted from the node or cell (e.g., detect signals at a signal level above a threshold) or where a wireless device may transmit wireless signals to the node or cell (e.g., transmit signals such that they are detected at the node or cell at a signal level above a threshold). In an embodiment, wireless devices 102 and 104 may comprise differing channel conditions when communicating with access node 106. For example, wireless device 102 may be proximate to access node 106 or in a center of coverage area 110 for access node 106 while wireless device 104 may be at the edge of coverage area 110 for access node 106.

In an embodiment, an uplink transmit power for wireless devices 102 and 104 may affect the coverage area for access node 106. For example, uplink transmit power reductions, such as those required to comply with standards for wireless communications or local regulations for wireless transmissions, may have a negative effect on the coverage area of an access node. Moreover, uplink transmit power reductions may be triggered for some uplink transmissions but not others, for instance based on the particular frequency bands and resource blocks used for the transmissions. In some embodiments, parameters that may lead to transmit power reductions for a wireless device may be considered when allocating resource blocks. Allocations based on such parameters may both allocate resource blocks effectively for uplink transmissions and allocate resource blocks to wireless devices near a cell edge that are less likely to be impacted by uplink transmit power reductions.

Figure 2:
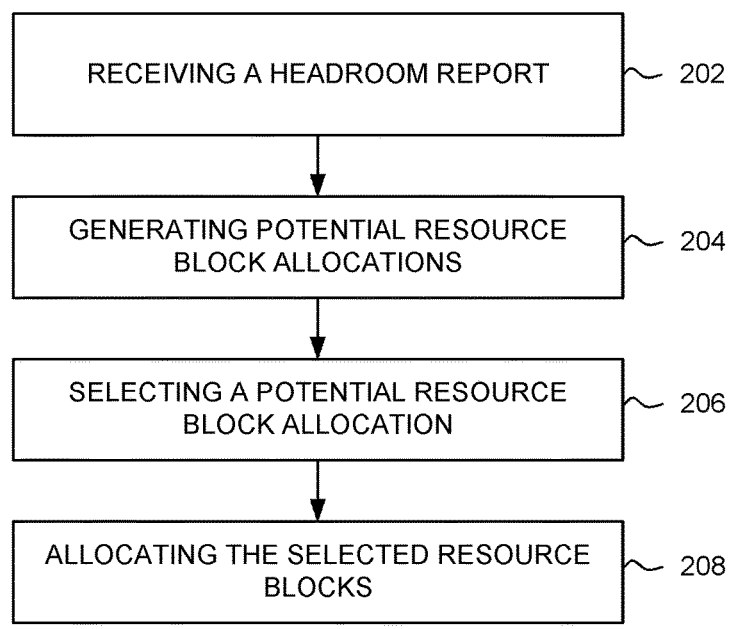
FIG. 2 illustrates an exemplary method for allocating resource blocks based on uplink transmission parameters.

FIG. 2 illustrates an exemplary method for allocating resource blocks based on uplink transmission parameters according to an embodiment. The method will be discussed with reference to the exemplary communication system 100 illustrated in FIG. 1, however, the method can be implemented with any suitable communication system.

Referring to FIG. 2, at step 202, a headroom report that comprises a transmission power headroom for a wireless device may be received. For example, wireless device 104 may be selected for resource block allocation. In an embodiment, wireless device 104 may transmit a headroom report to access node 106 that comprises the difference between the current transmit power for a transmission from the wireless device and a maximum uplink transmit power. In this example, the maximum uplink transmit power may be established by a network administrator, a standard used for communication (e.g., LTE), a local regulation, or in any other manner.

At step 204, potential resource block allocations for the wireless device may be generated based on channel information for a plurality of frequency bands, the generated potential resource block allocations comprising a frequency band and a time. For example, based on the frequency bands available for communication between wireless device 104 and access node 106, potential resource block allocations comprising a frequency band and a time may be generated.

At step 206, a potential resource block allocation may be selected from among the potential resource block allocations based on a maximum power reduction for the potential allocation and the reported transmission power headroom for the wireless device. For example, each of the potential allocations may also comprise a corresponding maximum power reduction, where the maximum power reduction is retrieved based on the frequency for the frequency band of the allocation and the resource block number for the time slot of the allocation. In some embodiments, a potential resource block allocation may be selected from among the potential allocations based on a maximum power reduction for the allocation and the reported transmission power headroom for the wireless device.

At step 208, the selected resource blocks may then be allocated for the wireless device. For example, the selected resource blocks may be allocated to wireless device 104.

Figure 3:
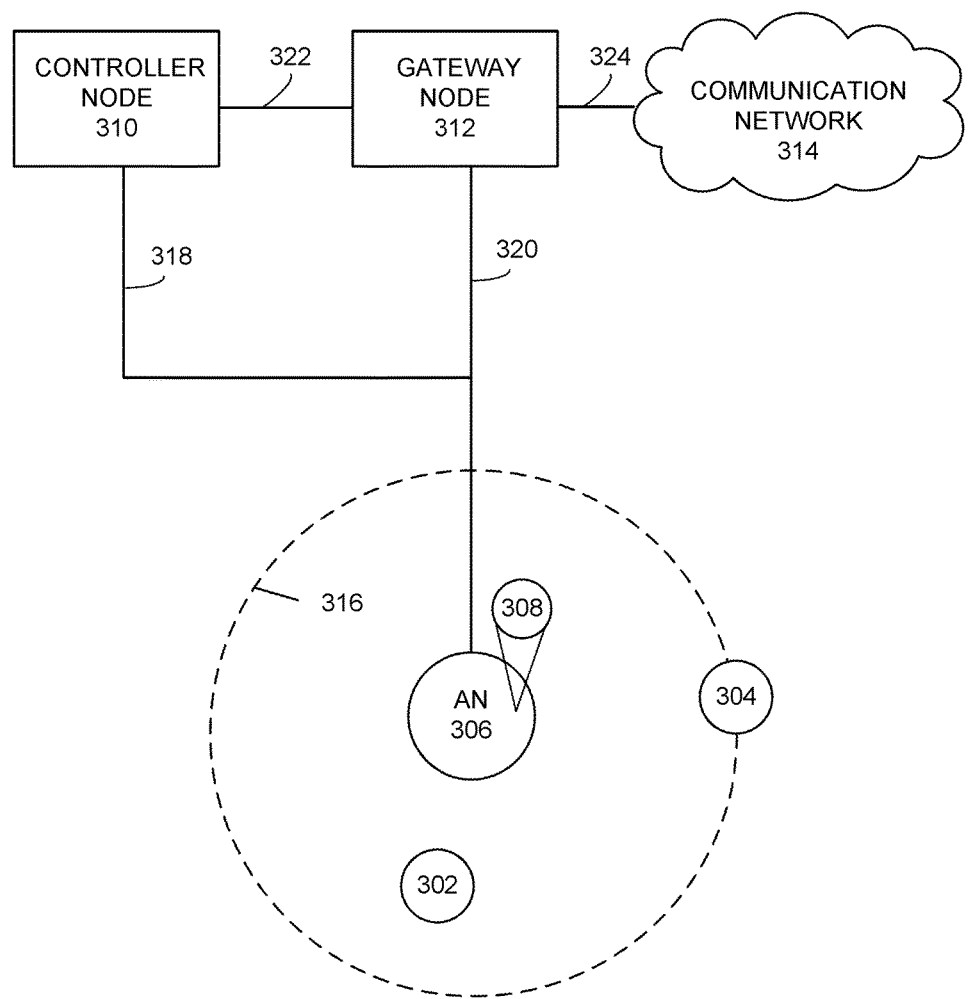
FIG. 3 illustrates another exemplary communication system to adjust subframe transmissions based on uplink data rate.

FIG. 3 illustrates another exemplary communication system 300 to allocate resource blocks based on uplink transmission parameters according to an embodiment. Communication system 300 may comprise wireless devices 302 and 304, access node 306, scheduler 308, controller node 310, gateway node 312, communication network 314, coverage area 316, and communication links 318, 320, 322, and 324.

Other network elements may be present in the communication system 300 to facilitate communication but are omitted for clarity, such as base stations, base station controllers, gateways, mobile switching centers, dispatch application processors, and location registers such as a home location register or visitor location register.

Wireless devices 302 and 304 can be any device configured to communicate over communication system 300 using a wireless communication link. For example, wireless device 302 and 304 can include a cell phone, a smart phone, a computing platform such as a laptop, palmtop, or a tablet, a personal digital assistant, relay communication device, or an internet access device, and combinations thereof.

Access nodes 306 is a network node capable of providing wireless communication to wireless devices 302 and 304, and can be, for example, a base transceiver station, a radio base station, an eNodeB device, a small cell (i.e. pico node, femto node, and the like), or any other suitable network element. In an embodiment, access node 306 can comprise a serving access node for wireless device 302. Access node 306 may communicate with controller node 310 over communication link 318, and with gateway node 312 over communication links 320. Although only one access node is illustrated in FIG. 3, wireless devices 302 and 304 (and other wireless device not depicted) can be in communication with a plurality of access nodes and/or small cells. The plurality of access nodes and/or small cells can be associated with different networks and can support different communication protocols and radio access technologies.

Access node 306 may comprise scheduler 308 that schedules wireless transmissions for wireless devices 302 and 304. Scheduler 308 may comprise hardware and associated circuitry or software implementing computer code to perform scheduling functions. Scheduler 308 may be communicatively connected to one or more antennas of access node 306 such that the scheduler may configure the access node to transmit downlink signals and receive uplink signals according to a schedule (e.g., resource block allocations).

Controller node 310 can be any network node configured to manage services within system 300. Controller node 310 may provide other control and management functions for system 300. The controller node 310 can be a single device having various functions or a plurality of devices having differing functions. For example, controller node 310 can include at least one of a multi-cell/multicast coordination entity (MCE), a mobility management entity (MME), a radio network controller (RNC), a mobile switching center (MSC), and a combination thereof.

Controller node 310 can comprise a processor and associated circuitry to execute or direct the execution of computer-readable instructions to obtain information. Controller node 310 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 310 can receive instructions and other input at a user interface. Controller node 310 can comprise a processor and associated circuitry to execute or direct the execution of computer-readable instructions to obtain information.

Gateway node 312 is a network element which can comprise a processor and associated circuitry to execute or direct the execution of computer-readable instructions. Gateway node 312 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 312 can provide instructions to access node 306 related to channel selection in communications with wireless devices. For example, gateway node 312 can comprise at least one of a serving gateway (SGW), a packet data network gateway (PDNGW), a cellular gateway (CGW), and a combination thereof.

Communication network 314 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 314 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 314 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 318, 320, 322, and 324 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 306, controller node 310, gateway node 312, and communication network 314 which are omitted for clarity, including additional processing nodes, routers, gateways, and physical and/or wireless data links for carrying data among the various network elements. In an embodiment, any of controller node 310, gateway node 312, and one or more modules of access node 306, may perform all or parts of the methods of FIGS. 2, 4, and 7.

In operation, access node 306 may establish communication with wireless devices 302 and 304 such that access node 306 provides the wireless devices access to a communication network (e.g., communication network 314). In an embodiment, system 300 may use a plurality of carriers in order to provide wireless communication services. For example, a plurality of carriers that comprise bandwidth for wireless communications (e.g., one or more carriers over a 1.25 GHz spectrum, one or more carriers over a 1900 Mhz spectrum, one or more carriers over a 800 Mhz spectrum, and the like) may include a plurality of channels (e.g., 5 Mhz channels, 10 Mhz channels, 15 Mhz channels, and the like) that may further be divided into subcarriers. In an embodiment, a frequency band may comprise a carrier, a channel, a subcarrier, a plurality of any of these, or any other suitable frequency band.

In an embodiment, access node 306 may comprise coverage area 316. For example, a coverage area may be the area around an access node or cell where a wireless device may detect wireless signals transmitted from the node or cell (e.g., detect signals at a signal level above a threshold) or where a wireless device may transmit wireless signals to the node or cell (e.g., transmit signals such that they are detected at the node or cell at a signal level above a threshold). In an embodiment, wireless devices 302 and 304 may comprise differing channel conditions when communicating with access node 306. For example, wireless device 302 may be proximate to access node 306 or in a center of coverage area 316 for access node 306 while wireless device 304 may be at the edge of coverage area 316.

In an embodiment, an uplink transmit power for wireless devices 302 and 304 may affect the coverage area for access node 306. For example, uplink transmit power reductions, such as those required to comply with standards for wireless communications or local regulations for wireless transmissions, may have a negative effect on the coverage area of an access node. Moreover, uplink transmit power reductions may be triggered for some uplink transmissions but not others, for instance based on the particular frequency bands and resource blocks used for the transmissions. In some embodiments, parameters that may lead to transmit power reductions for a wireless device may be considered when allocating resource blocks. Allocations based on such parameters may both allocate resource blocks effectively for uplink transmissions and allocate resource blocks to wireless devices near a cell edge that are less likely to be impacted by uplink transmit power reductions.

Figure 4:
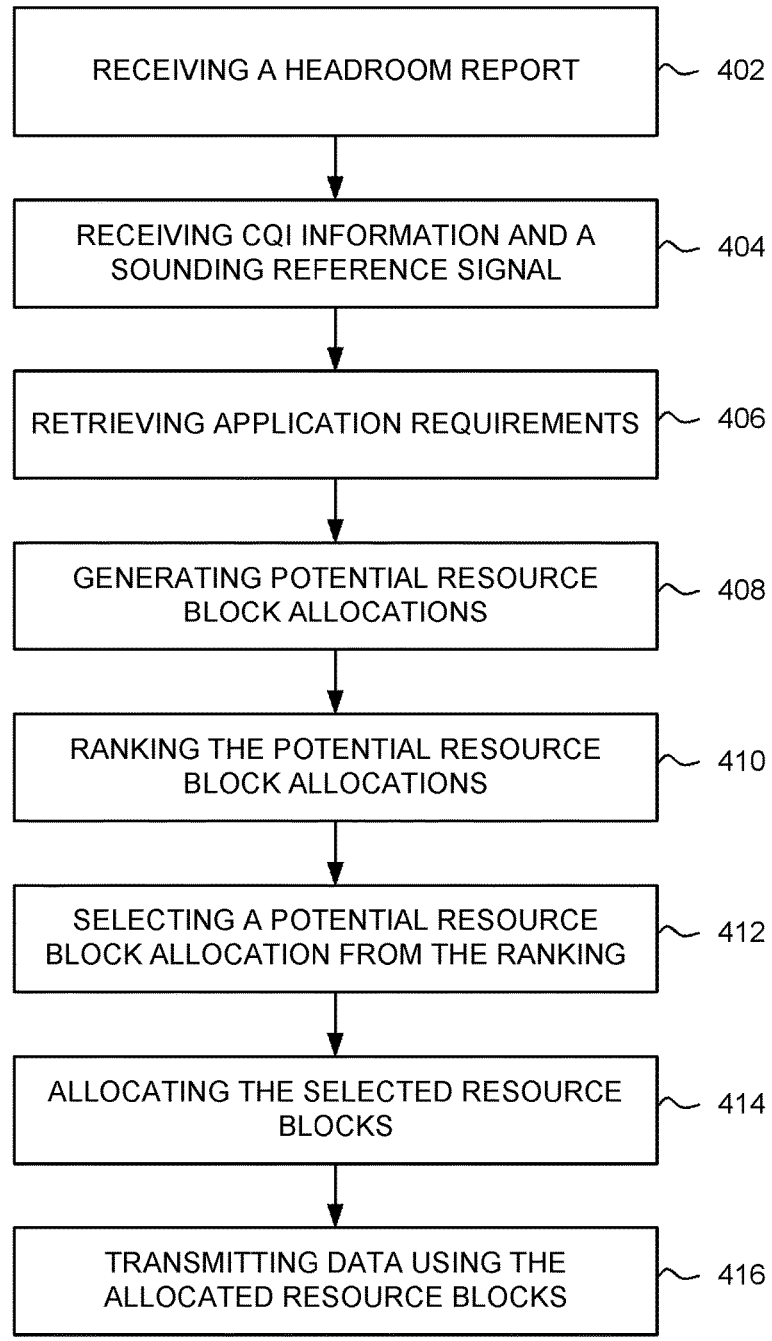
FIG. 4 illustrates another exemplary method for allocating resource blocks based on uplink transmission parameters.

FIG. 4 illustrates an exemplary method for allocating resource blocks based on uplink transmission parameters according to an embodiment. The method will be discussed with reference to the exemplary communication system 300 illustrated in FIG. 3, however, the method can be implemented with any suitable communication system.

Referring to FIG. 4, at step 402, a headroom report that comprises a transmission power headroom for a wireless device may be received. For example, wireless device 304 may be selected for resource block allocation. In an embodiment, wireless device 304 may transmit a headroom report to access node 306 that comprises the difference between the current transmit power for a transmission from the wireless device (e.g., the transmission used to transmit the headroom report) and a maximum uplink transmit power. For example, the headroom report may comprise a value that corresponds to a power level difference between a current transmission power for the wireless device and the maximum transmission power for the wireless device (e.g., measured in dB). In an embodiment, the maximum uplink transmit power for a wireless device may be established by a network administrator, a standard used for communication (e.g., LTE), a local regulation, or in any other manner.

In an embodiment, the maximum transmission power for wireless device 304 may include one or more adjustments based on a permitted maximum power adjustment (MPR) or addition maximum power adjustment (A-MPR). For instance, local regulations (e.g., country regulations) may include certain requirements for out of band emissions (OOBE) such that a network operator or wireless device does not interfere with other wireless resources (e.g., licensed by other organizations or operators). In an embodiment, a spectral emissions mask may be applied by the wireless device in order to meet such regulations. Accordingly, based on conditions for wireless device 304, one or more of MPR or A-MPR may be applied to a maximum transmission power, effectively lowering the uplink maximum transmission power for the wireless device. Any MPR or A-MPR applied to the maximum power of a transmission may be accounted for when reporting the current power headroom in the headroom report (e.g., any reduction may be represented by the value transmitted in the head room report).

At step 404, one or more of channel quality indicator (CQI) information for a plurality of frequency bands and a sounding reference signal may be received from wireless device 304. For example, wireless device 304 may transmit a CQI report to access node 306 that comprises the channel quality for the wireless device over a plurality of frequency bands. The CQI report for a subset of the frequency bands used by access node 306 and wireless device 304 to communicate (e.g., frequency bands comprising the highest quality) or may comprise a full report of frequency band channel information.

Figure 5:
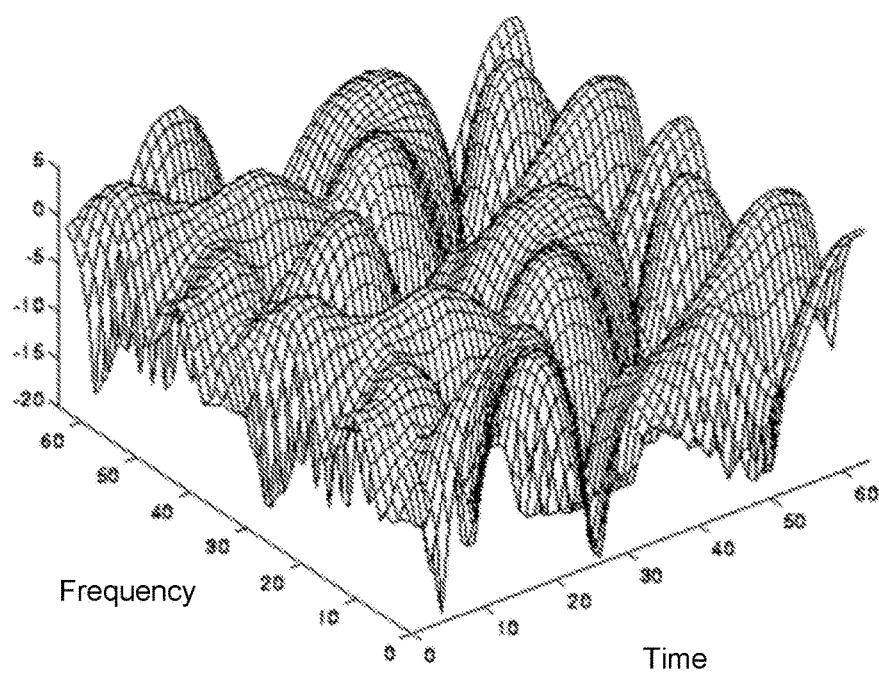
FIG. 5 illustrates exemplary physical resource blocks.

FIG. 5 may illustrate the graphical representation of channel information for a wireless device based on a CQI report. For example, FIG. 5 may illustrate a power level for received signals at a wireless device over particular frequencies at particular times.

In an embodiment, an instruction to transmit a sounding reference signal (SRS) may be sent to wireless device 304. A sounding reference signal may comprise a reference signal transmitted by a wireless device (e.g., wireless device 304) over a frequency band or a plurality of frequency bands. An access node (e.g., access node 306) may receive the sounding reference signal (or a plurality of sounding reference signals) at a received signal level and subsequently determine channel state information (e.g., channel quality) relative to the wireless device for each the one or more frequency bands. In an embodiment, the CQI report may indicate channel quality for frequency bands on a downlink channel to wireless device 304 while the SRS may indicate channel quality on an uplink channel from wireless device 304.

At step 406, one or more application requirements may be retrieved for wireless device 304. For example, wireless device 304 may comprise application requirements for its communication with access node 306, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. One or more of these application requirements may be retrieved for wireless device 304.

At step 408, potential resource block allocations for the wireless device may be generated based on channel information for a plurality of frequency bands, the generated potential resource block allocations comprising frequency bands and timings. For example, based on the frequency bands available for communication between wireless device 304 and access node 306, potential resource block allocations comprising frequency bands and times may be generated.

Figure 6:
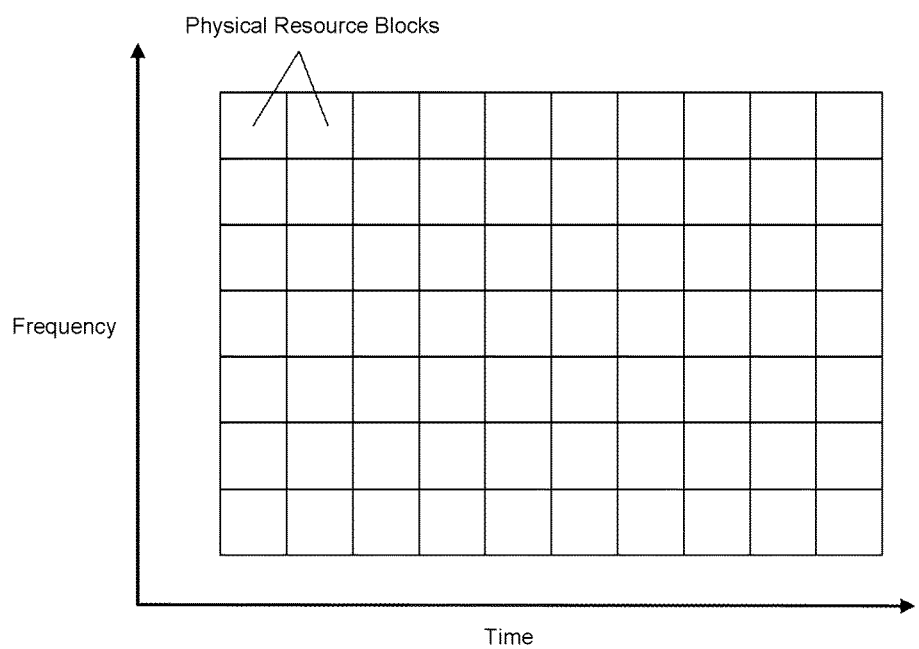
FIG. 6 illustrates an exemplary measurement report from a wireless device.

FIG. 6 illustrates a plurality of resource blocks. For example, a resource block may be identifiable based on a frequency for the resource blocks and time slot for the resource block. Once allocated, a wireless device may be able to communicate data with access node 306 on the particular set of frequencies and time slots for the particular resource block allocated.

In an embodiment, the potential resource block allocations may comprise a set of the possible resource block allocations for wireless device 304. For example, the set of potential resource block allocations may be selected from among the possible resource block allocations for wireless device 304 based on combinations of a modulation and coding scheme associated with the resource blocks, a region for the resource blocks, associated MPR and A-MPR for the resource blocks, and, in some instances, estimated frequency selective scheduling (FSS) gain for the resource blocks.

At step 410, the generated potential resource block allocations may be ranked. In an embodiment, the potential allocations may be ranked according to a calculated adjusted headroom metric. For example, each of the potential allocations may also comprise a corresponding maximum power reduction for the resource blocks that comprise the potential allocations, where the maximum power reduction is retrieved based on the frequency for the frequency bands of the allocation and the resource block numbers for the times of the allocation.

For instance, a MPR and A-MPR allowance may be associated with a particular frequency (or frequency band) and time slot. Accordingly, MPR and A-MPR may be associated with particular resource blocks. The associated MPR and A-MPR may be established by a network operator, a local regulation, an implemented standard, or in any other suitable manner. Depending on the particular frequency and time slot for a resource block the associated MPR and/or A-MPR values may vary (e.g., ranging from 0 to 3 dB). In an embodiment, a data structure (e.g., a table) may store the associations between the resource blocks and the permitted MPR and A-MPR values. These values may be retrieved from the data structure, or otherwise received in any suitable manner.

In an embodiment, an adjusted headroom metric may be calculated based on the reported headroom for the wireless device and the MPR and A-MPR values. For example, the calculated adjusted headroom metric for the one or more potential resource block allocations may comprise $PHR_{adj}=PHR_{wd}-MPR_{rb}-A-MPR_{rb}$, where $PHR_{adj}$ comprises the calculated adjusted head room metric, $PHR_{wd}$ comprises a power head room for wireless device 304 (e.g. as reported), and $MPR_{rb}$ and $A-MPR_{rb}$ comprise permitted power reductions associated with the resource blocks comprising the potential allocations. In an embodiment, the potential allocations may be ranked in ascending order according to the calculated adjusted headroom metric. For example, the highest ranked potential allocation may comprise the lowest adjusted headroom metric value.

In some embodiments, the potential allocations may be ranked according to an estimated FSS gain and a calculated adjusted headroom metric. For example, based on the channel state information for the plurality of frequency bands (e.g., indicated by the CQI report and/or SRS), a frequency selective scheduling gain (e.g., power gain) may be estimated for particular sets of frequencies and time slots (e.g., for the potential resource block allocations).

Referring to FIG. 5, particular power levels are illustrated at particular combinations of frequency and time. Based on this information, FSS gains may be estimated for the particular combinations of frequency and time (e.g., for particular resource blocks or regions of resource blocks). In the embodiment, the FSS gains shall be calculated based on channel information feedback (e.g., the CQI report and/or SRS) for various frequencies/sub-bands from the user device. In an embodiment, potential resource blocks (or regions of resource blocks) for allocation may be ranked based on the estimated FSS gains (e.g., highest gains to lowest gains).

In an embodiment, an adjusted headroom metric may be calculated based on the reported headroom for the wireless device, the estimated FSS gain for the resource blocks comprising the potential allocations, and the MPR and A-MPR values. For example, the calculated adjusted headroom metric for the one or more potential resource block allocations may comprise $PHR_{adj}=PHR_{wd}+FSSgain_{rb}-MPR_{rb}-A-MPR_{rb}$, where $PHR_{adj}$ comprises the calculated adjusted head room metric, $PHR_{wd}$ comprises a power head room for wireless device 304 (e.g. as reported), $FSSgain_{rb}$ comprises the estimated FSSgain for the resource blocks comprising the one or more potential, and $MPR_{rb}$ and $A-MPR_{rb}$ comprise permitted power reductions associated with the resource blocks comprising the one or more potential allocations. In an embodiment, the potential allocations may be ranked in ascending order according to the calculated adjusted headroom metric. For example, the highest ranked potential allocation may comprise the lowest adjusted headroom metric value.

In an embodiment, a first ranking of the potential allocations may be based on the estimated FSS gains and a second ranking for the potential allocations may be based on the calculated adjusted headroom metric. For example, an FSS gain may be estimated for regions of resource blocks, as described herein, and the potential allocations may be ranked, in a first ranking, according to the regions for the potential allocations. The first ranking may be in descending order. The potential allocations within a region may then be ranked, in a second ranking, according to the calculated adjusted headroom metric values for the allocations. The second ranking may be in ascending order. Accordingly, the highest ranked potential allocation according to both the first and second ranking may comprise the allocation within the region with the highest estimated FSS gain that also comprises the lowest calculated adjusted headroom metric for that region.

At step 412, one or more potential resource block allocations may be selected from among the potential resource block allocations based on combinations of an estimated frequency selective scheduling gain for the allocation, a maximum power reduction for the allocation, and the reported transmission power headroom for the wireless device. For example, one or more potential allocations may be selected according to the first ranking or the first and second rankings.

In an embodiment, the potential resource block allocations may be ranked according to estimated FSS gain per region, the first ranking, and further ranked according to calculated adjusted head room metric per potential allocation within the region, the second ranking. Accordingly, a potential allocation may be selected based on estimated FSS gain from the first ranking and based on adjusted head room metric from the second ranking. In an embodiment, the potential allocation that corresponds to the highest ranked region from the first ranking and highest ranked potential allocation from the second ranking may be selected.

In an embodiment, the parameters for the selected allocation of resource blocks may be compared to an uplink power reduction criteria. For example, the uplink power reduction criteria may comprise $PHR_{adj} > PHR_{margin}$, where $PHR_{adj}$ comprises the calculated adjusted head room metric, and $PHR_{Margin}$ comprises a predetermined or dynamic margin for the adjusted head room metric. For example, $PHR_{margin}$ may comprise a buffer value (e.g., 1 dB, 2 dB, 3 dB, or any other suitable value). In some embodiments, $PHR_{margin}$ may comprise a null value (e.g., 0 value).

In an embodiment, a selected potential allocation that meets the criteria may be allocated for wireless device 304 (step 414). If the selected potential allocation fails to meet the criteria, a next potential allocation may be selected according to the first and second rankings of potential allocations until a selected potential allocation meets the criteria. If no potential allocation meets the criteria, wireless device 304 may not be allocated resource blocks for a transmission at that time.

In an embodiment, the selected resource block allocation may also be selected when the allocation meets the retrieved application requirements for wireless device 304. For example, wireless device 304 may comprise one or more applications requirements, and the selected allocation may be selected to meet these retrieved application requirements.

At step 414, the selected resource block allocation may then be allocated for the wireless device. For example, the resource blocks comprising the selected allocation may be allocated to wireless device 304. Scheduler 308 may allocate and accordingly schedule the communication between access node 306 and wireless device 304 using the allocated one or more resource blocks. At step 416, data may be communicated over the allocated resource blocks. For example, data may be communicated over the allocated resource blocks between wireless device 304 and access node 306.

Figure 7:
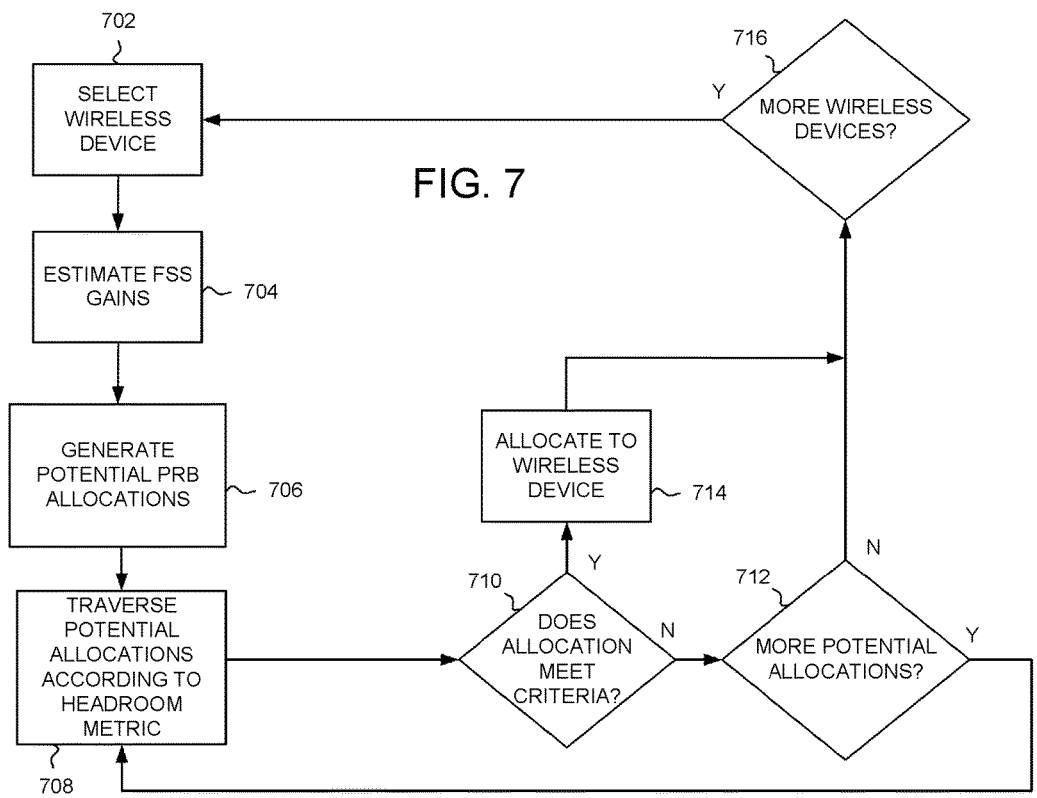
FIG. 7 illustrates another exemplary method for allocating resource blocks based on uplink transmission parameters.

FIG. 7 illustrates another exemplary method for allocating resource blocks based on uplink transmission parameters according to an embodiment. The method will be discussed with reference to the exemplary communication system 300 illustrated in FIG. 3, however, the method can be implemented with any suitable communication system.

Referring to FIG. 7, at step 702 a wireless device may be selected for resource block allocation. For example access node 306 may be in communication with a plurality of wireless devices (not displayed in FIG. 3). Scheduler 308 of access node 306 may select one of the plurality of wireless devices (e.g., wireless device 304) for resource block allocation.

In an embodiment, the wireless device selection may be based on a scheduling algorithm used by scheduler 308. For instance, scheduler 308 may implement a proportional fairness algorithm, a round robin algorithm, a max C/I algorithm, and any other suitable scheduling algorithm. The wireless device selected for allocation may be selected in any other suitable manner.

In an embodiment, a headroom report that comprises a transmission power headroom for the selected wireless device may be received. For example, wireless device 304 may be selected for resource block allocation. In an embodiment, wireless device 304 may transmit a headroom report to access node 306 that comprises the difference between the current transmit power for a transmission from the wireless device (e.g., the transmission used for transmitting the headroom report) and a maximum uplink transmit power.

In an embodiment, one or more of channel quality indicator (CQI) information for a plurality of frequency bands and a sounding reference signal may be received from wireless device 304. For example, wireless device 304 may transmit a CQI report to access node 306 that comprises a channel quality for the wireless device over a plurality of frequency bands. The CQI report for a subset of the frequency bands used by access node 306 and wireless device 304 to communicate (e.g., frequency bands comprising the highest quality) or may comprise a full report of frequency band channel information.

In an embodiment, an instruction to transmit a sounding reference signal (SRS) may be sent to wireless device 304. A sounding reference signal may comprise a reference signal transmitted by a wireless device (e.g., wireless device 304) over a frequency band or a plurality of frequency bands. An access node (e.g., access node 306) may receive the sounding reference signal (or a plurality of sounding reference signals) at a received signal level and subsequently determine channel state information (e.g., channel quality) relative to the wireless device for each of the one or more frequency bands. In an embodiment, the CQI report may indicate channel quality for frequency bands on a downlink channel to wireless device 304 while the SRS may indicate channel quality on an uplink channel from wireless device 304.

In an embodiment, one or more application requirements may be retrieved for wireless device 304. For example, wireless device 304 may comprise application requirements for its communication with access node 306, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. One or more of these application requirements may be retrieved for wireless device 304.

At step 704, frequency selective scheduling (FSS) gains may be estimated for resource blocks of the plurality of frequencies bands. For example, based on the channel state information for the plurality of frequency bands (e.g., indicated by the CQI report and/or SRS), a frequency selective scheduling gain (e.g., power gain) may be estimated for particular sets of frequencies and time slots (e.g., for particular resource blocks). Referring to FIG. 5, particular power levels are illustrated at particular combinations of frequency and time. Based on this information, FSS gains may be estimated for the particular combinations of frequency and time (e.g., for particular resource blocks or resource block regions).

At step 706, potential resource block allocations for the wireless device may be generated based on channel information for a plurality of frequency bands, the generated potential resource block allocations comprising a frequency band and a time. For example, based on the frequency bands available for communication between wireless device 304 and access node 306, potential resource block allocations comprising a frequency band and a time may be generated.

In an embodiment, the potential resource block allocations may comprise a set of the possible resource block allocations for wireless device 304. For example, the set of potential resource block allocations may be selected from among the possible resource block allocations for wireless device 304 based on combinations of a modulation and coding scheme associated with the resource blocks, a region for the resource blocks, associated MPR and A-MPR for the resource blocks, and, in some instances, the estimated FSS gain for the resource blocks.

At step 708, ranked potential resource block allocations may be traversed according to a calculated adjusted head room metric. For example, the calculated adjusted headroom metric for the resource block allocations may comprise $PHR_{adj}=PHR_{wd}+MPR_{rb}-A\text{-}MPR_{rb}$, where $PHR_{adj}$ comprises the calculated adjusted head room metric, $PHR_{wd}$ comprises a power head room for wireless device 304 (e.g. as reported), and $MPR_{rb}$ and $A\text{-}MPR_{rb}$ comprise permitted power reductions associated with the one or more resource block allocations. In another example, the calculated adjusted headroom metric for the resource block allocations of the region may comprise $PHR_{adj}=PHR_{wd}+FSSgain_{rb}-MPR_{rb}-A\text{-}MPR_{rb}$, where $PHR_{adj}$ comprises the calculated adjusted head room metric, $PHR_{wd}$ comprises a power head room for wireless device 304 (e.g. as reported), $FSSgain_{rb}$ comprises the estimated FSSgain for the potential allocations, and $MPR_{rb}$ and $A\text{-}MPR_{rb}$ comprise permitted power reductions associated with the one or more resource blocks comprising the allocations. In an embodiment, the resource blocks allocations of the region may be ranked in ascending order according to the calculated adjusted headroom metric. Accordingly, a potential allocation with the lowest $PHR_{adj}$ value may be ranked highest in the ranking. In an example, the highest ranked potential resource block allocation may be selected and the method of FIG. 7 may progress to step 710.

At step 710, the selected allocation may be compared to a criteria. For example, the parameters for the selected allocation of resource blocks may be compared to an uplink power reduction criteria. In an embodiment, the following inequality may be evaluated: $PHR_{adj}>PHR_{margin}$, where $PHR_{adj}$ comprises the calculated adjusted head room metric, and $PHR_{Margin}$ comprises a predetermined or dynamic margin for the adjusted head room metric. For example, $PHR_{margin}$ may comprise a buffer value (e.g., 1 dB, 2 dB, 3 dB, or any other suitable value). In some embodiments, $PHR_{margin}$ may comprise a null value (e.g., 0 value).

In an embodiment, when the parameters for a selected resource block allocation meets the uplink power reduction criteria, the method of FIG. 7 may progress to step 714. At step 714, the selected resource block allocation may be allocated for wireless device 304. The method of FIG. 7 may then progress to step 716, where it is determined whether a next wireless device is to be allocated resource blocks. The method of FIG. 7 may then restart at step 702 with a newly selected wireless device.

In an embodiment, when the parameters for a selected resource block allocation fail to meet the uplink power reduction criteria (at step 710), the method of FIG. 7 may progress to step 712. At step 712, it may be determined whether there are additional potential resource block allocations (e.g., within the ranking of potential allocations). Where there are additional potential resource block allocations, the method of FIG. 7 may progress to step 710, where the next potential allocation of resource blocks from the ranked allocations according to the calculated adjusted head room metric may be selected. From here, steps 710 and 712 may be repeated until a selected allocation of resource blocks meets the criteria or until there are no more resource block allocations to iterate over.

When there are no more potential resource block allocations (e.g., from the ranking of potential allocations), the method of FIG. 7 may progress to step 716, where it is determined whether a next wireless device is to be allocated resource blocks. The method of FIG. 7 may then restart at step 702 with a newly selected wireless device.

Figure 8:
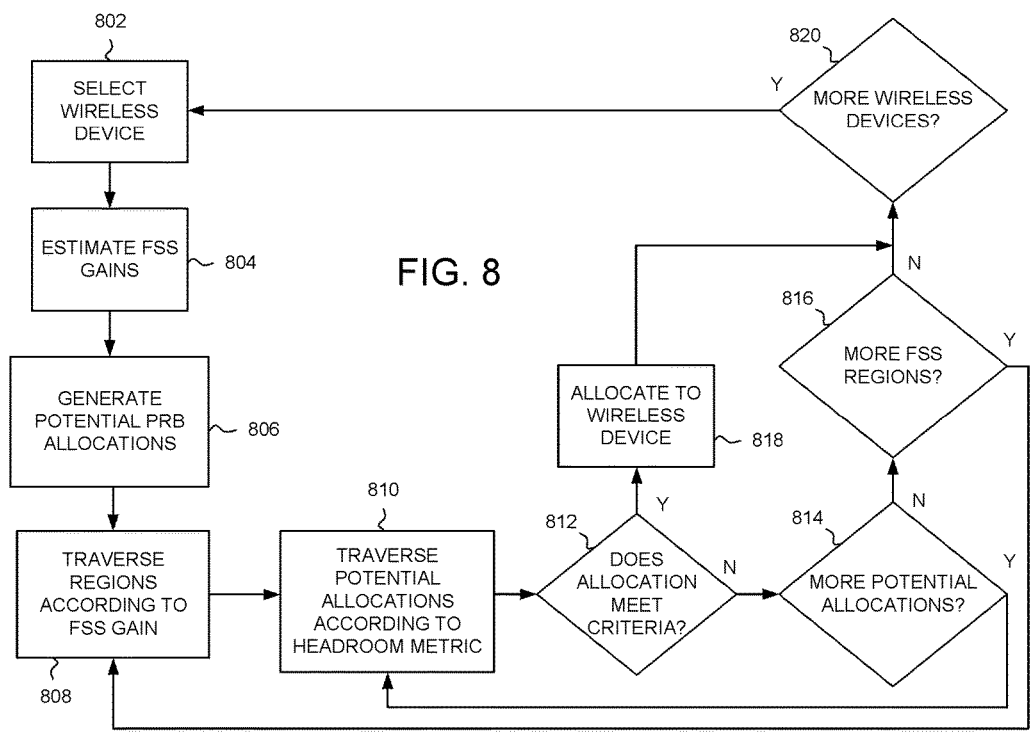
FIG. 8 illustrates an exemplary method for allocating resource blocks based on uplink transmission parameters and frequency selective scheduling.

FIG. 8 illustrates another exemplary method for allocating resource blocks based on uplink transmission parameters according to an embodiment. The method will be discussed with reference to the exemplary communication system 300 illustrated in FIG. 3, however, the method can be implemented with any suitable communication system.

Referring to FIG. 8, at step 802 a wireless device may be selected for resource block allocation. For example access node 306 may be in communication with a plurality of wireless devices (not displayed in FIG. 3). Scheduler 308 of access node 306 may select one of the plurality of wireless devices (e.g., wireless device 304) for resource block allocation.

In an embodiment, the wireless device selection may be based on a scheduling algorithm used by scheduler 308. For instance, scheduler 308 may implement a proportional fairness algorithm, a round robin algorithm, a max C/I algorithm, and any other suitable scheduling algorithm. The wireless device selected for allocation may be selected in any other suitable manner.

In an embodiment, a headroom report that comprises a transmission power headroom for the selected wireless device may be received. For example, wireless device 304 may be selected for resource block allocation. In an embodiment, wireless device 304 may transmit a headroom report to access node 306 that comprises the difference between the current transmit power for a transmission from the wireless device (e.g., the transmission used for transmitting the headroom report) and a maximum uplink transmit power.

In an embodiment, one or more of channel quality indicator (CQI) information for a plurality of frequency bands and a sounding reference signal may be received from wireless device 304. For example, wireless device 304 may transmit a CQI report to access node 306 that comprises a channel quality for the wireless device over a plurality of frequency bands. The CQI report for a subset of the frequency bands used by access node 306 and wireless device 304 to communicate (e.g., frequency bands comprising the highest quality) or may comprise a full report of frequency band channel information.

In an embodiment, an instruction to transmit a sounding reference signal (SRS) may be sent to wireless device 304. A sounding reference signal may comprise a reference signal transmitted by a wireless device (e.g., wireless device 304) over a frequency band or a plurality of frequency bands. An access node (e.g., access node 306) may receive the sounding reference signal (or a plurality of sounding reference signals) at a received signal level and subsequently determine channel state information (e.g., channel quality) relative to the wireless device for each of the one or more frequency bands. In an embodiment, the CQI report may indicate channel quality for frequency bands on a downlink channel to wireless device 304 while the SRS may indicate channel quality on an uplink channel from wireless device 304.

In an embodiment, one or more application requirements may be retrieved for wireless device 304. For example, wireless device 304 may comprise application requirements for its communication with access node 306, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. One or more of these application requirements may be retrieved for wireless device 304.

At step 804, frequency selective scheduling (FSS) gains may be estimated for resource blocks of the plurality of frequencies bands. For example, based on the channel state information for the plurality of frequency bands (e.g., indicated by the CQI report and/or SRS), a frequency selective scheduling gain (e.g., power gain) may be estimated for particular sets of frequencies and time slots (e.g., for particular resource blocks). Referring to FIG. 5, particular power levels are illustrated at particular combinations of frequency and time. Based on this information, FSS gains may be estimated for the particular combinations of frequency and time (e.g., for particular resource blocks or resource block regions).

At step 806, potential resource block allocations for the wireless device may be generated based on channel information for a plurality of frequency bands, the generated potential resource block allocations comprising a frequency band and a time. For example, based on the frequency bands available for communication between wireless device 304 and access node 306, potential resource block allocations comprising a frequency band and a time may be generated.

In an embodiment, the potential resource block allocations may comprise a set of the possible resource block allocations for wireless device 304. For example, the set of potential resource block allocations may be selected from among the possible resource block allocations for wireless device 304 based on combinations of a modulation and coding scheme associated with the resource blocks, a region for the resource blocks, associated MPR and A-MPR for the resource blocks, and, in some instances, the estimated FSS gain for the resource blocks.

At step 808, ranked potential resource block allocations may be traversed according to estimated FSS gain. In an embodiment, the potential resource block allocations may be ranked, for instance according to a frequency selective scheduling (FSS) gain estimated for the resource blocks. For example, regions of resource blocks may be identified and an estimated FSS gain may be associated with a region. A region may refer to a block comprising a plurality of resource blocks within a particular frequency range and a particular time range. In an embodiment, the potential resource block allocations may be sorted by region, and each of the regions may be ranked according to FSS gain (in descending order). In an example, the highest ranked region according to FSS gain may be selected and the method of FIG. 8 may progress to step 810.

At step 810, the selected region may be traversed according to a calculated adjusted headroom metric for the resource block allocations comprising the region. For example, the calculated adjusted headroom metric for the resource block allocations of the region may comprise $PHR_{adj} = PHR_{wd} + MPR_{rb} - A\text{-}MPR_{rb}$, where $PHR_{adj}$ comprises the calculated adjusted head room metric, $PHR_{wd}$ comprises a power head room for wireless device 304 (e.g. as reported), and $MPR_{rb}$, and $A\text{-}MPR_{rb}$ comprise permitted power reductions associated with the one or more resource blocks comprising the allocations. In another example, the calculated adjusted headroom metric for the resource block allocations of the region may comprise $PHR_{adj} = PHR_{wd} + FSSgain_{rb} - MPR_{rb} - A\text{-}MPR_{rb}$, where $PHR_{adj}$ comprises the calculated adjusted head room metric, $PHR_{wd}$ comprises a power head room for wireless device 304 (e.g. as reported), $FSSgain_{rb}$ comprises the estimated FSSgain for the potential allocations of the region, and $MPR_{rb}$, and $A\text{-}MPR_{rb}$ comprise permitted power reductions associated with the one or more resource blocks comprising the allocations. In an embodiment, the resource blocks allocations of the region may be ranked in ascending order according to the calculated adjusted headroom metric. Accordingly, a potential allocation with the lowest $PHR_{adj}$ value may be ranked highest in the ranking. In an example, the highest ranked potential resource block allocation may be selected and the method of FIG. 8 may progress to step 812.

At step 812, the selected allocation may be compared to a criteria. For example, the parameters for the selected allocation of resource blocks may be compared to an uplink power reduction criteria. In an embodiment, the following inequality may be evaluated: $PHR_{adj} > PHR_{margin}$, where $PHR_{adj}$ comprises the calculated adjusted head room metric, and $PHR_{Margin}$ comprises a predetermined or dynamic margin for the adjusted head room metric. For example, $PHR_{margin}$ may comprise a buffer value (e.g., 1 dB, 2 dB, 3 dB, or any other suitable value). In some embodiments, $PHR_{margin}$ may comprise a null value (e.g., 0 value).

In an embodiment, when the parameters for a selected resource block allocation meets the uplink power reduction criteria, the method of FIG. 8 may progress to step 818. At step 818, the selected resource block allocation may be allocated for wireless device 304. The method of FIG. 8 may then progress to step 820, where it is determined whether a next wireless device is to be allocated resource blocks. The method of FIG. 8 may then restart at step 802 with a newly selected wireless device.

In an embodiment, when the parameters for a selected resource block allocation fail to meet the uplink power reduction criteria (at step 812), the method of FIG. 8 may progress to step 814. At step 814, it may be determined whether there are additional potential resource block allocations for the selected region of resource blocks. Where there are additional potential resource block allocations for the selected region of resource blocks, the method of FIG. 8 may progress to step 810, where the next potential allocation of resource blocks from the ranked allocations according to the calculated head room metric may be selected. From here, steps 812 and 814 may be repeated until a selected allocation of resource blocks meets the criteria or until there are no more resource block allocations to iterate over for the selected region of resource blocks.

When there are no more resource block allocations for the selected region of resource blocks, the method of FIG. 8 may progress to step 816, where it is determined whether there are additional regions of resource blocks ranked according to estimated FSS gain. Where there are additional regions of resource blocks ranked according to FSS gain, the method of FIG. 8 may progress to step 808, where the next region of resource blocks from the ranked regions is selected. From here, steps 810, 812 and 814 may be repeated until a selected allocation of resource blocks meets the criteria or until there are no more regions of resource blocks to iterate over. When there are no more regions of resource blocks to iterate over, the method of FIG. 8 may progress to step 820 where it is determined whether a next wireless device is to be allocated resource blocks. The method of FIG. 8 may then restart at step 802 with a newly selected wireless device.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 9:
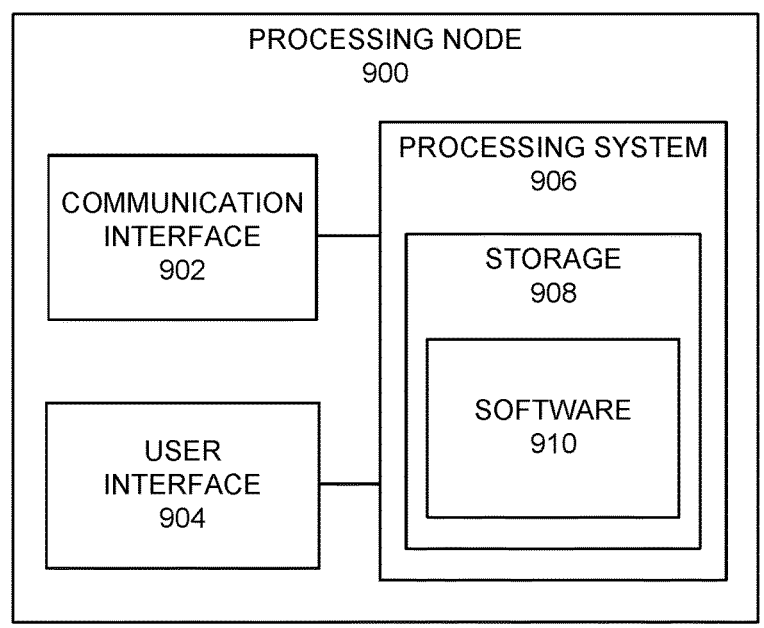
FIG. 9 illustrates an exemplary processing node.

FIG. 9 illustrates an exemplary processing node 900 in a communication system. Processing node 900 comprises communication interface 902, user interface 904, and processing system 906 in communication with communication interface 902 and user interface 904. Processing node 900 can be configured to determine a communication access node for a wireless device. Processing system 906 includes storage 908, which can comprise a disk drive, flash drive, memory circuitry, or other memory device. Storage 908 can store software 910 which is used in the operation of the processing node 900. Storage 908 may include a disk drive, flash drive, data storage circuitry, or some other memory apparatus. Software 910 may include computer programs, firmware, or some other form of machine-readable instructions, including an operating system, utilities, drivers, network interfaces, applications, or some other type of software. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

Examples of processing node 900 include controller node 310 and gateway node 312. Processing node 900 can also be an adjunct or component of a network element, such as an element of access node 106, access node 306, and the like. Processing node 800 can also be another network element in a communication system. Further, the functionality of processing node 900 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for allocating resource blocks based on uplink transmission parameters, the method comprising:
   receiving, from a wireless device in communication with an access node, a headroom report comprising a transmission power headroom for the wireless device;
   generating potential resource block allocations for the wireless device based on channel information for a plurality of frequency bands, resource blocks of the potential resource block allocations comprising a frequency band and time;
   ranking the potential resource block allocations based on maximum power reductions for the potential resource block allocations;
   selecting, from among the potential resource block allocations, a resource block allocation having a highest ranking, wherein a maximum power reduction for the selected resource block allocation and the transmission power headroom for the wireless device meet a criteria; and
   allocating resource blocks included in the selected resource block allocation to the wireless device,
   wherein the selected resource block allocation meets the criteria when the transmission power headroom for the wireless device minus the maximum power reduction for the selected resource block allocation is greater than a threshold.

2. The method of claim 1, further comprising transmitting data from the wireless device to the access node using the allocated resource blocks.

3. The method of claim 1, wherein the maximum power reduction for the selected resource block allocation is determined based on frequency bands for the resource blocks included in the selected resource block allocation and timings for the resource blocks included in the selected allocation.

4. The method of claim 1, further comprising:
   retrieving one or more application requirements for the wireless device; and
   wherein the maximum power reduction for the selected resource block allocation and the transmission power headroom for the wireless device meet the criteria when the selected resource block allocation satisfies the one or more application requirements.

5. The method of claim 1, further comprising:
   estimating frequency selective scheduling gains based on the channel information.

6. The method of claim 5, wherein the selected resource block allocation meets the criteria when the transmission power headroom for the wireless device plus the estimated frequency selective scheduling gain for the selected resource block allocation minus the maximum power reduction for the selected resource block allocation is greater than another threshold.

7. The method of claim 1, wherein the channel information for the plurality of frequency bands is based on one or more of a received channel quality indicator report from the wireless device and a sounding reference signal from the wireless device.

8. A system for allocating resource blocks based on uplink transmission parameters, the system comprising:
 an access node comprising a scheduler and a processor configured to:
  receive, from a wireless device in communication with the access node, a headroom report comprising a transmission power headroom for the wireless device;
  generate potential resource block allocations for the wireless device based on channel information for a plurality of frequency bands, resource blocks of the potential resource block allocations comprising a frequency band and time;
  rank the potential resource block allocations based on estimated frequency selective scheduling gains for the potential resource block allocations, the frequency selective scheduling gains being estimated based on the channel information;
  select, from among the potential resource block allocations, a resource block allocation having a highest ranking, wherein an estimated frequency selective scheduling gain for the selected resource block allocation, a maximum power reduction for the selected resource block allocation, and the transmission power headroom for the wireless device meet a criteria for the selected resource block allocation; and
  allocate resource blocks included in the selected resource block allocation to the wireless device.

9. The system of claim 8, wherein the access node is further configured to receive data from the wireless device using the allocated resource blocks.

10. The system of claim 8, wherein the access node is further configured to:
 determine maximum power reductions for the potential resource block allocations.

11. The system of claim 10, wherein the selected resource block allocation meets the criteria when the transmission power headroom for the wireless device minus the maximum power reduction for the selected resource block allocation is greater than a threshold.

12. The system of claim 11, wherein the maximum power reduction for the selected resource block allocation is determined based on frequency bands for resource blocks included in the selected resource block allocation and timings for the resource blocks included in the selected resource block allocation.

13. The system of claim 11, wherein the access node is further configured to:
 retrieve one or more application requirements for the wireless device; and
 wherein the maximum power reduction for the selected resource block allocation and the transmission power headroom for the wireless device meet the criteria when the selected resource block allocation satisfies the one or more application requirements.

14. The system of claim 8, wherein the selected resource block allocation meets the criteria when the transmission power headroom for the wireless device plus the estimated frequency selective scheduling gain for the selected resource block allocation minus the maximum power reduction for the selected resource block allocation is greater than a threshold.

15. The system of claim 8, wherein the channel information for the plurality of frequency bands is based on one or more of a received channel quality indicator report from the wireless device and a sounding reference signal from the wireless device.

16. A method for allocating resource blocks based on uplink transmission parameters, the method comprising:
 receiving, from a wireless device in communication with an access node, a headroom report that comprises a transmission power headroom for the wireless device;
 generating potential resource block allocations for the wireless device based on channel information for a plurality of frequency bands, wherein resource blocks of the potential resource block allocations comprise a frequency band and time slot;
 determining frequency selective scheduling gains for regions of the potential resource block allocations, a region comprising a block of resource blocks within a range of frequencies and a range of time slots;
 ranking the regions according to values of the frequency selective scheduling gains;
 calculating an adjusted headroom metric based on the transmission power headroom included in the headroom report received from the wireless device;
 ranking, within at least one region of the ranked regions, the potential resource block allocations of the at least one region according to the adjusted headroom metric, a frequency selective scheduling gain for the at least one region of the ranked regions, and a maximum power reduction associated with the potential resource block allocations;
 iteratively selecting, from among the regions, resource block allocations according to the rankings, the selected resource block allocations meeting a power headroom criteria for the wireless device; and
 allocating resource blocks included in the selected resource block allocations to the wireless device.

17. The method of claim 16, wherein the channel information for the plurality of frequency bands is based on one or more of a received channel quality indicator report from the wireless device and a sounding reference signal from the wireless device.

* * * * *